United States Patent

[11] 3,563,436

| [72] | Inventors | Rimi Reynard<br>Port Marly;<br>Michel Chatard, Chatou; Roger Tindy, Bougival; Jean Thiery, Le Pecq, France |
|---|---|---|
| [21] | Appl. No. | 760,491 |
| [22] | Filed | Sept. 18, 1968 |
| [45] | Patented | Feb. 16, 1971 |
| [73] | Assignee | Institut Francais Du Petrole Des Carburants Et Lubrifiants<br>(Hauts de Seine), France |
| [32] | Priority | Sept. 28, 1967 |
| [33] | | France |
| [31] | | 122,723 |

[54] ENDLESS CONVEYOR FOR FEEDING A FLEXIBLE ELONGATED MEMBER
8 Claims, 3 Drawing Figs.

[52] U.S. Cl. ................................................... 226/173, 226/195

[51] Int. Cl. .................................................. B65h 17/34
[50] Field of Search ......................................... 226/173, 170, 171, 172, 195, 74; 254/(Inquired)

[56] References Cited
UNITED STATES PATENTS

| 1,911,157 | 5/1933 | Leech | 226/173X |
| 2,868,356 | 1/1959 | Haaff | 226/172X |
| 3,103,306 | 9/1963 | Eldik | 226/172 |
| 3,302,838 | 2/1967 | Thaler | 226/172 |

Primary Examiner—Richard A. Schacher
Attorney—Craig, Antonelli, Stewart & Hill

ABSTRACT: An endless conveyor for feeding a flexible elongated member, comprising endless chain means which are in gripping engagement with the elongated member along a path having a radius of curvature which decreases in the direction of advancement of the endless chain means.

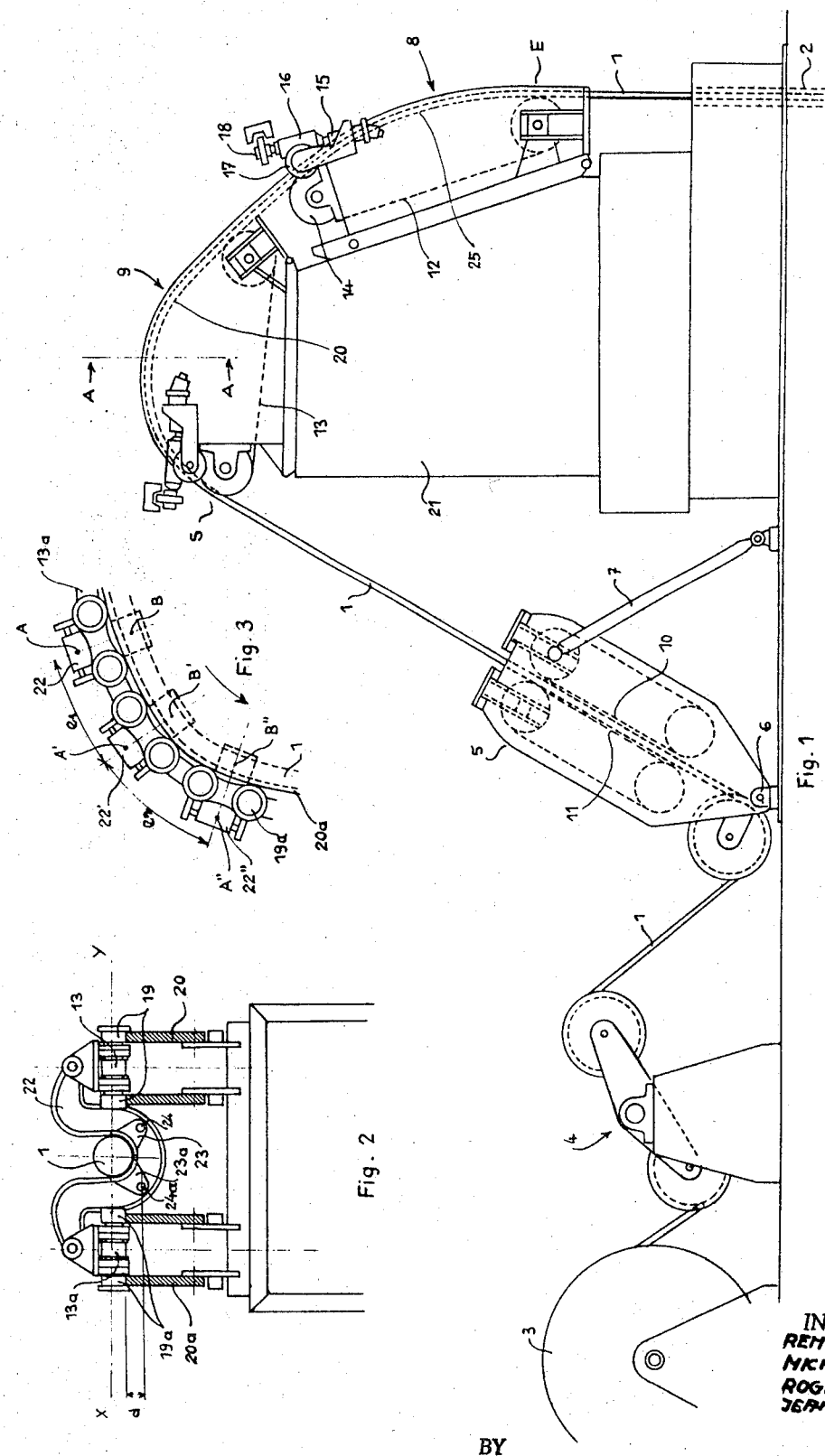

ENDLESS CONVEYOR FOR FEEDING A FLEXIBLE ELONGATED MEMBER

The present invention relates to a device providing for the traction of a flexible line, such as a cable or a pipe, having a certain longitudinal elasticity, this device being in particular suitable for continuously drawing a flexible drill pipe, at the lower end of which the drill bit is directly connected with a driving motor.

The device according to the invention will be more particularly described hereinunder in its application to drilling with a flexible pipe, but it must be understood that this application is by no way a limitation of this invention.

With conventional devices for the traction of a flexible line, such as a flexible drill pipe, which include means for gripping this line, secured to endless chains, there occurs from the inlet to the outlet of the device (considering the direction of advancement of the gripping or clamping shoes a gradual decrease in the tension of the flexible line.

A first drawback which results therefrom is that, for flexible lines having a certain longitudinal elasticity, the elongation of the line under the action of the traction force decreases from the inlet to the outlet of the traction device, which as a result of the relative inelasticity of the traction chains, causes some tendency to a relative sliding or creeping of the flexible line with respect to the traction shoes gripping this line.

Such a relative creeping can lead to a fast wear of the coating of the flexible line, if there is selected a friction factor between the line and the gripping shoes of the endless chain which provides a sufficient adherence.

The amplitude of this relative creeping is proportional to the length of the flexible line engaged in the traction device and to the difference of the tractive forces applied to this line at the inlet and the outlet of the traction device respectively.

Another drawback due to this decrease in the tension from the inlet to the outlet of the device is to be found in particular in the case where the means for holding the flexible line is constituted of articulated gripping shoes or pairs of shoes (self-gripping shoes) which provides for spontaneous gripping or clamping of the flexible line, under the action of the traction itself, which is exerted on the flexible line.

The variation in this tension from the inlet to the outlet of the device causes then a variation in the self-gripping pressure of the gripping shoes.

These drawbacks are alleviated, according to the invention, by using a traction grab in which the path followed by the gripping shoes has a radius of curvature which varies from the inlet to the outlet of the grab, this grab been so designed that this radius of curvature decreases either progressively or stepwise from the inlet to the outlet of the grab.

Such an arrangement allows the gripping force applied by the gripping shoes to be more uniformly distributed all along the grab.

According to a preferred embodiment of this grab, the gripping shoes will, at least over a part of their path, follow the profile of a spiral curve having a radius of curvature which decreases from the inlet of the grab, where the tension of the flexible line is the highest, to the outlet of this grab.

According to a preferred embodiment there will be used, instead of a single grab, a plurality of traction grabs or traction elements in series, each of which is preferably of the above-described type and is driven by a device applying a constant torque thereto.

This arrangement has the advantage of allowing to divide into two fractions the tractive force, as well as the total length of flexible line engaged in the traction device. The amplitude of the relative creeping of the flexible line, with respect to the gripping shoes, is substantially reduced within each traction element and there is thus the possibility of a relaxation, between the different traction elements, of the stresses due to this relative creeping.

Thus by dividing, for example, the traction device into three elements (this number of elements being however not limitative), the traction applied by each of these elements is only one third of the total tractive force and sine the length of flexible line engaged in each element is also only one third of the total length engaged in the whole traction device, the magnitude of the relative creeping in each traction element is only one ninth of what it would be if the traction device was constituted of only one element.

By driving the chains of each traction element with a constant torque it is moreover possible to adapt the speed of advancement of these chains to the variations in the elastic elongation of the flexible line from one traction element to the following one, as a result of the progressive decrease of the flexible line from the inlet to the outlet of the traction device.

By this arrangement according to the invention there is associated with this decrease in the tension $t$ of the flexible line a corresponding and substantially proportional decrease in the radius of curvature $R$ of the path or guideway which is followed by the clamping or gripping shoes.

Thus the ratio $t/R$ remains substantially constant from the inlet to the outlet of the device and if the gripping shoes are of the self-gripping type, their clamping pressure on the flexible line will also remain constant, since this pressure is substantially proportional to this ratio $t/R$.

The invention will be illustrated by a nonlimitative embodiment thereof which is described hereinunder with reference to the attached drawings, wherein:

FIG. 1 is an overall view of this embodiment;

FIG. 2 is a partial view on a larger scale corresponding to section AA of FIG. 1; and FIG. 3 illustrates an important feature of the device shown by FIG. 1, concerning the position of the gripping shoes.

The traction device illustrated by FIG. 1 is used for raising a flexible drill pipe 1 from a bore-well 2, this pipe being reeled, as its raising proceeds, on the storing winch 3 of a conventional type, driven in rotation by a nonillustrated motor.

The reference numeral 4 designates a device for regulating the tension of the pipe between the winch 3 and the traction device according to the invention and for providing a proper reeling of the pipe on the winch.

The illustrated embodiment of the device according to the invention includes a conventional traction device 5 inclined with respect to the horizontal, articulated at 6 at its lower part and supported by the arm 7 also articulated at its lower part, in combination with two traction devices 8 and 9 in series provided with endless chains carrying gripping shoes which clamp the flexible pipe.

In the embodiment selected by way of example, the conventional traction device 5 is of the type provided with endless chains carrying gripping shoes (not shown in the drawing) which clamp the pipe between two parallel runs 10 and 11, these endless chains passing over driving pinions at both ends of the traction device.

The traction device according to the invention illustrated by FIG. 1 preferably includes several traction elements such as 8 and 9, rather than a single traction element, which allows to reduce between the inlet E and the outlet S of the traction device, the amplitude of the relative creeping of the pipe with respect to the gripping shoes, as hereinabove explained and moreover provides for relaxation of the stresses due to this creeping phenomenon, between the two traction elements.

Each of the elements 8 and 9 of the traction device includes two endless chains for driving the pipe, such as the chains 12—12a for the traction element 8 and 13—13a for the element 9 (FIG. 1), these chains passing over pinions at both ends of the traction element.

One of the pinions of each traction element, such as the pinion 14, is driven in rotation by conventional means including a constant torque driving motor 15 (for example an hydraulic motor), the drive shaft of which rotates a conventional speed reducer provided with worm gear 16—17, driving the pinion 14. A brake 18 is located at one end of the shaft of the motor 15.

FIG. 2 shows that the two endless chains of each traction element, such as the chains 13 and 13a of the element 9, provided with rollers 19, 19a, are displaceable along guide ways or rolling tracks such as 20 and 20a supported by the frame 21 of the traction device.

The links of these chains carry groove sections such as 22 wherein the pipe 1 is engaged.

On these groove sections are pivotally mounted gripping or clamping shoes, such as 23, 23a, about axes 24, 24a extending substantially parallelly to the direction of advancement of the groove section.

These clamping shoes are so arranged as to provide for self-clamping of the pipe 1, thereby advancing it by friction.

The articulations of the gripping shoes provide for a better distribution of the contact pressure over the periphery of the pipe.

The self-gripping pressures applied by the shoes to the pipe, as well at the bottom of the groove as laterally, are substantially proportional to the ratio $t/R$, wherein $t$ is the tension applied to the pipe at the place of the gripping shoe and $R$ the radius of curvature at the place of the shoe, of the guideway followed by the chain carrying this shoe.

The tension $t$ exerted on the pipe 1, at a point located between the inlet E and the outlet S of the traction device according to the invention complies, at least in a first approximation with the relation $t = Te^{+f\alpha}$ (classical formula for the driving pulleys), T being the tension at the inlet of the traction device, $f$ the apparent friction factor of the gripping shoes on the pipe and $\alpha$ measuring the length of the arc of the rolling track or guideway on which the pipe is engaged, between the inlet E of the traction device and the considered location on this device.

According to the invention the rolling tracks such as 10 of the traction element 9, and 25 of the element 8 are given a profile which substantially follows a spiral the radius of which decreases from the inlet to the outlet of the traction element (this radius decreasing substantially as $e^{-f\alpha}$), which permits to keep substantially constant the ratio $t/R$ and thus the self-gripping pressures all along the traction device.

FIG. 3 diagrammatically shows a portion of an endless chain such as chain 13a of an element of the traction device (the element 9, for example), the links of this chain carrying successive groove portions 22, 22', 22" whereon are pivotally mounted gripping shoes (not shown), such as the shoes 23, 23a (FIG. 2) for gripping or clamping the pipe 1.

The arrow indicates the direction of displacement of this endless chain, the rollers of which roll along a guideway or rolling track 20a having a radius of curvature which exponentially decreases in the direction of advancement of the endless chain, the amplitude of this exponential decrease remaining however generally small, as shown by FIG. 1.

The use, according to the invention, of a profile having a decreasing radius of curvature not only provides a more uniform distribution of the gripping forces of the shoes, but also exhibits the important advantage of reducing the creeping of the flexible line with respect to the gripping shoes.

Such a creeping normally appears, as already indicated, as a result of a progressive shortening of the pipe from the inlet to the outlet of the traction grab, in correlation with the decrease of the tractive force applied to the pipe.

The profile selected according to the invention permits it, inasmuch as the pipe and the gripping shoes are placed at the level of the guideway or under the latter, to reduce the distance between adjacent gripping shoes as the radius of curvature of the rolling track decreases. It is thus possible by a suitable choice of the level of the pipe, with respect to that of the guideway or rolling track, to obtain that the reduction of the distance between the adjacent gripping shoes be substantially equal to the shortening of the pipe, thereby suppressing the creeping of this pipe.

As a matter of fact, as shown by FIG. 3, the spacing between corresponding points, such as A and A', of two successive gripping shoes located above the rolling track 20a increases as the chain is displaced, as a result of the increasing curvature of this chain, (the distance $e_1$ between the points A and A' is smaller than the distance $e_2$ between A' and A", A" being the point of 22" corresponding to the point A' of 22"), while by placing the gripping shoes, as shown by FIGS. 2 and 3, at the level or even preferably, under the rolling track or guideway 20a (i.e. in the concavity of this rolling track between the latter and its center of curvature), the spacing between the adjacent shoes decreases as the chain is advancing (the distance between the points B' and B" in FIG. 3 is smaller than the distance between the points B and B").

Thus the progressive decrease in the radius of curvature of this rolling track in the direction of advancement of the gripping shoes results in the latter being progressively moved nearer one another and this the more that the shoes are located more remote under the rolling track 20a, so that this relative movement of the shoes compensates for the shortening of the pipe whose tension decreases.

In practice the distance $d$ (FIG. 2) will be so selected for each element of the traction device (element 8 or 9) that, as a result of the progressive reduction of the distance between the shoes, accompanying the progressive decrease in the radius of curvature of the rolling track, there is compensated as accurately as possible for the retraction of the pipe the tension of which is decreasing, so that, for example, an exact compensation is obtained for an average value of the tension applied o to the line at the inlet of the considered traction element 8 or 9 (this inlet tension decreases in the course of the unwinding of the pipe 1 from the winch 3), while the value of the relative creeping of the pipe with respect to the gripping shoes does not exceed the permissible limit for the maximum tension at the inlet of the considered traction element.

According to another (not illustrated) embodiment of the invention it could also be possible to provide a flexible connection between the clamping shoes and their rolling track, or guideway, so that the distance $d$ varies with the tension T and thus the progressive decrease in the distance between two clamping shoes is automatically adapted to the values of the tensions applied to the flexible line.

We claim:

1. Endless conveyor for feeding a flexible elongated member, constituted by at least one traction element comprising endless chain means, wherein said endless chain means are in gripping engagement with the flexible elongated member along a path which, at least over part of its length, has a radius of curvature which decreases in the direction of advancement of the endless chain means.

2. Endless conveyor according to claim 1, wherein the endless chain means is provided with rollers in contact with a guideway which, on at least a part of its length, has a radius of curvature decreasing in the direction of advancement of the endless chain means, the endless chain means being in gripping engagement with the flexible elongated member along the part of the guideway having the decreasing radius of curvature.

3. Endless conveyor according to claim 1, wherein the endless chain means is in gripping engagement with the flexible elongated member along a path having a spiral profile at least over a part of its length.

4. Endless conveyor according to claim 1, wherein the endless chain means is provided with means for clamping the flexible elongated member, and the clamping means being located in the concavity of the path having a decreasing radius of curvature.

5. Endless conveyor according to claim 1, wherein the endless chain means are provided with automatic gripping means for the flexible elongated member.

6. Endless conveyor according to claim 1, wherein a plurality of traction elements are arranged in series, and each of the traction elements being provided with constant torque driving means for driving the endless chain means.

7. Endless conveyor according to claim 1, wherein the endless chain means includes at least two endless chains provided with means for clamping the flexible elongated member, and the clamping means being located in the concavity of the path.

8. Endless conveyor according to claim 7, wherein a plurality of traction elements are arranged in series, and each of the traction elements is provided with constant torque driving means for driving the endless chains.